United States Patent
Uno et al.

(10) Patent No.: US 7,760,408 B2
(45) Date of Patent: Jul. 20, 2010

(54) HOLOGRAM RECORDING DEVICE AND HOLOGRAM RECORDING METHOD

(75) Inventors: Kazushi Uno, Kawasaki (JP); Kouichi Tezuka, Kawasaki (JP); Hiroyasu Yoshikawa, Kawasaki (JP); Yasumasa Iwamura, Kawasaki (JP); Yuzuru Yamakage, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/329,600

(22) Filed: Dec. 7, 2008

(65) Prior Publication Data

US 2009/0116086 A1 May 7, 2009

Related U.S. Application Data

(63) Continuation of application No. PCT/JP2006/311585, filed on Jun. 9, 2006.

(51) Int. Cl.
*G03H 1/28* (2006.01)
*G11B 7/00* (2006.01)

(52) U.S. Cl. ........................................ 359/24; 369/103

(58) Field of Classification Search .................. 359/10, 359/11, 22, 24; 369/103
See application file for complete search history.

(56) References Cited

U.S. PATENT DOCUMENTS

| 2004/0218241 A1 | 11/2004 | Roh |
| 2006/0007512 A1 | 1/2006 | Kanesaka et al. |

FOREIGN PATENT DOCUMENTS

| JP | A 9-197947 | 7/1997 |
| JP | A 2004-335067 | 11/2004 |
| JP | A 2005-234145 | 9/2005 |
| JP | A 2006-23445 | 1/2006 |

*Primary Examiner*—Alessandro Amari
(74) *Attorney, Agent, or Firm*—Greer, Burns & Crain, Ltd.

(57) ABSTRACT

A hologram recording device for irradiating a recording beam (S) to a hologram recording medium (B) at a fixed incident angle ($\theta s$) and irradiating a reference beam (R) to an illuminated region (p) of the recording beam (S) by variably controlling an incident angle ($\theta r$) of the reference beam (R) on the hologram recording medium (B), whereby a hologram is recorded on the illuminated region (p) in multiple, includes at least a variable reflector (10) directing the reference beam (R) to the illuminated region by reflection and being swung around a predetermined axis (x) for changing the incident angle ($\theta r$) of the reference beam (R); and a light shield (11) being swung integrally with the variable reflector (10) for partially shielding the reference beam (R) so that a luminous flux diameter thereof becomes narrower as the incident angle ($\theta r$) becomes larger.

2 Claims, 11 Drawing Sheets

HOLOGRAM RECORDING DEVICE AND HOLOGRAM RECORDING METHOD

This application is a Continuation of International Application Serial No. PCT/JP2006/311585, filed Jun. 9, 2006.

TECHNICAL FIELD

The present invention relates to a hologram recording device for recording holograms in multiple through interference of an recording beam of a fixed incident angle and a reference beam of a variable incident angle, and to a method of recording the hologram.

BACKGROUND ART

Hologram recording methods so far developed include the one disclosed in Patent Document 1. In the method disclosed in this document, an recording beam is emitted perpendicularly to the hologram recording medium while a reference beam is emitted to the region irradiated by the recording beam at different incident angles by controlling the inclination of a multiple mirror. The multiple mirror is inclined about a fulcrum supported by a support member, which is movable in parallel to the hologram recording medium. The incident angle of the reference beam onto the hologram recording medium is changed according to the inclination of the multiple mirror, in which process the multiple mirror is moved parallel to the hologram recording medium so as to position the reference beam on the region to be illuminated. Under such configuration, the recording beam and the reference beam interfere in the illuminated region, so that the holograms are recorded in multiple according to the intersection angle between the recording beam and the reference beam.

With the conventional hologram recording method cited above, however, in the case where the incident angle of the reference beam onto the hologram recording medium is increased, the illumination width of the reference beam is increased according to the illuminance cosine law, which inevitably leads to an increase in area of a portion not superposed on the recording beam. In other words, an unnecessary exposure region irradiated only by an surplus portion of the reference beam is created on the end portions of the illuminated region, which constitutes a unit recording region where the holograms are to be recorded in multiple, and such unnecessary exposure region becomes larger in accordance with the incident angle of the reference beam. This makes it necessary to provide a large spacing between the adjacent unit recording regions in order to keep the unnecessary exposure regions, where only the reference beam is present, from overlapping, which imposes the disadvantage that the recording density cannot be enhanced.

DISCLOSURE OF THE INVENTION

The present invention has been proposed under the foregoing situation. An object of the present invention is to provide a hologram recording device and a hologram recording method that allow narrowing the spacing between the unit recording regions where the holograms are recorded in multiple, thereby facilitating increasing the recording density.

To achieve the foregoing object, the present invention takes the following technical measures.

A first aspect of the present invention provides a hologram recording device for irradiating a recording beam to a hologram recording medium, and irradiating a reference beam to an illuminated region of the recording beam by variably controlling an incident angle of the reference beam on the hologram recording medium, whereby a hologram is recorded on the illuminated region in multiple through interference between the recording beam and the reference beam, the device comprising: at least one variable reflector directing the reference beam to the illuminated region by reflection and being swung around a predetermined axis for changing the incident angle of the reference beam; and a light shield being swung integrally with the variable reflector for partially shielding the reference beam so that a luminous flux diameter of the reference beam becomes narrower as the incident angle becomes larger.

Preferably, the reference beam is made incident on the variable reflector in a fixed direction and with a fixed luminous flux diameter, and is irradiated to the illuminated region through the light shield after being reflected by the variable reflector.

Preferably, the hologram recording device further comprises a fixed reflector for reflecting the reference beam from the variable reflector at a fixed reflecting surface, and the reference beam is made incident on the variable reflector in a fixed direction and with a fixed luminous flux diameter, and is irradiated to the illuminated region through the light shield after being reflected by the variable reflector and being again reflected by the fixed reflector.

Preferably, the variable reflector includes a first and a second variable reflector, and the device further comprises a fixed reflector reflecting the reference beam at a reflecting surface fixed between the first and the second variable reflector, and the reference beam is made incident on the first variable reflector in a fixed direction and with a fixed luminous flux diameter, is led to the fixed reflector through the light shield right before and right after being reflected by the first variable reflector, and is irradiated to the illuminated region after being reflected by the fixed reflector and then by the second variable reflector.

A second aspect of the present invention provides a hologram recording method comprising the steps of irradiating a recording beam to a hologram recording medium; and irradiating a reference beam to an illuminated region with the recording beam while variably controlling an incident angle of the reference beam on the hologram recording medium, whereby holograms is recorded on the illuminated region in multiple through interference between the recording beam and the reference beam; wherein the step of irradiating the reference beam to the illuminated region while variably controlling an incident angle of the reference beam includes partially shielding the reference beam so that the luminance flux diameter of the reference beam becomes smaller as the incident angle of the reference beam becomes larger.

BEST MODE FOR CARRYING OUT THE INVENTION

Figure 1:
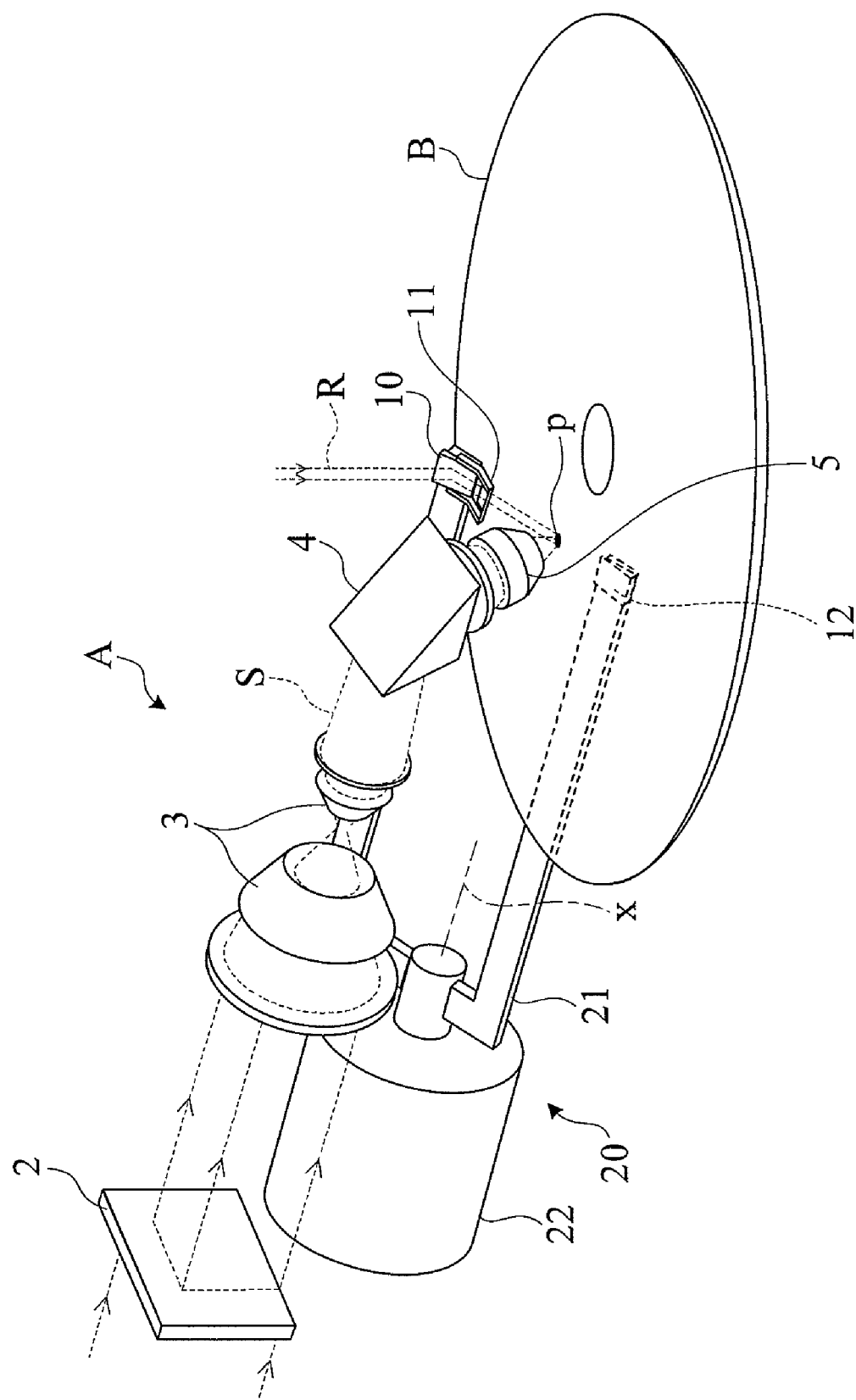
FIG. 1 is a perspective view showing an embodiment of a hologram recording device to which the present invention is applied.

Preferred embodiments of the present invention will be described below in details referring to the drawings.

Figure 2:
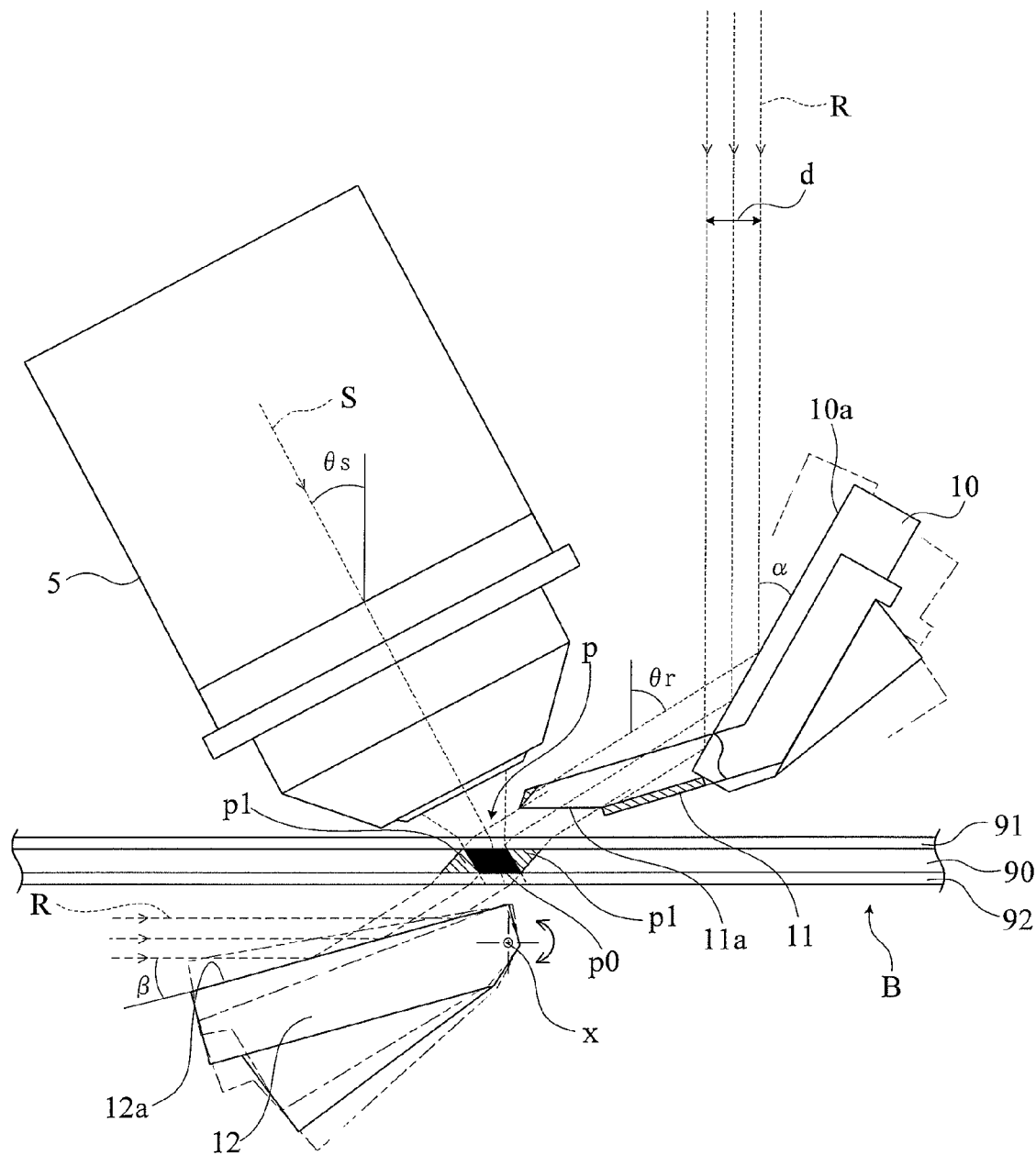
FIG. 2 is a cross-sectional view showing an important part of the hologram recording device shown in FIG. 1.

Referring to FIG. 1, a hologram recording device A according to an embodiment of the present invention emits a recording beam S to a disk-shaped hologram recording medium B in a predetermined inclined direction defining a fixed incident angle $\theta s$ (Ref. FIG. 2 and others), and emits a reference beam R to a region p illuminated by the recording beam S in an inclined direction opposite to that of the recording beam S and while variably controlling the incident angle, thereby recording holograms in multiple through interference between the recording beam S and the reference beam R.

The hologram recording device A includes a recording beam optical system that serves to emit the recording beam S, and a reference beam optical system that serves to emit the reference beam R to the hologram recording medium B while variably controlling the incident angle. Though not shown, a light source that emits a laser beam, a beam splitter that splits the laser beam into the recording beam S and the reference beam R, a collimator lens that converts the laser beam into parallel light, and so forth are provided. The recording beam optical system includes a spatial light modulator 2, a zoom lens 3, a beam splitter 4, and an objective lens 5 for the recording beam. The reference beam optical system includes a variable reflector 10 for recording, a light shield 11, a variable reflector 12 for reproduction, and a swinging unit 20 that causes those parts to swing in an integrated manner. The swinging unit 20 includes a U-shaped arm member 21 and a driving motor 22. The variable reflector 10 for recording and the light shield 11 are fixed at an end portion of the arm member 21 located above the hologram recording medium B. The variable reflector 12 for reproduction is fixed at the other end portion of the arm member 21 located below the hologram recording medium B. The arm set 21 is caused to swing by the driving motor 22 about a predetermined axis x generally parallel to a radial direction of the hologram recording medium B. The recording beam optical system and the reference beam optical system are mounted on a head (not shown) reciprocable radially of the hologram recording medium B.

As shown in FIG. 2, the hologram recording medium B includes as the intermediate layer a recording layer 90 constituted of, for example, a photopolymer, and light-transmitting cover layers 91, 92 stacked on the respective sides of the recording layer 90. In this embodiment, for example, the recording layer 90 has a thickness of about 1 mm, and the cover layers 91, 92 about 0.5 mm. In a recording process, the recording beam S and the reference beam R are emitted from above the hologram recording medium B. In a reproduction process, only the reference beam R is emitted from below the hologram recording medium B.

The laser beam emitted by the light source which is not shown is converted into parallel light by the collimator lens which is not shown, and then split into the recording beam S and the reference beam R by the beam splitter. The recording beam S is led to the spatial light modulator 2, while the reference beam R is led to the variable reflector 10 for recording or the variable reflector 12 for reproduction.

The spatial light modulator 2 is constituted of a transmissive liquid crystal device for example, and modulates the received recording beam S into light representing two-dimensional pixel pattern according to the information to be recorded. The recording beam S emitted from the spatial light modulator 2 is led to the beam splitter 4 via the zoom lens 3 to be finally incident on the hologram recording medium B at a fixed incident angle $\theta s$ through the objective lens 5 for the recording beam. In this embodiment, the incident angle $\theta s$ of the recording beam may be set at 28 deg., for example.

As shown in FIG. 2, the variable reflector 10 for recording and the variable reflector 12 for reproduction include flat reflecting surfaces 10a and 12a, respectively, and pivot about the predetermined axis x in an integrated manner. The reflecting surface 10a of the variable reflector 10 for recording reflects the reference beam R progressing generally perpendicular to the hologram recording medium B toward the illuminated region p obliquely downward. The luminous flux diameter d of the reference beam R is constant before reaching the reflecting surface 10a. The reflecting surface 12a of the variable reflector 12 for reproduction reflects the reference beam R progressing generally parallel to the hologram recording medium B toward the illuminated region p obliquely upward. Though not shown, the luminous flux diameter of the reference beam R incident on the reflecting surface 12a is also constant similarly to the recording process. Here, the variable reflector may be a galvano-mirror.

The light shield 11 is integrally formed with the variable reflector 10 for recording, and provided at the optical path of the reference beam R led from the reflecting surface 10a to the illuminated region p. The light shield 11 serves to shield a portion of the reference beam R advancing from the reflecting surface 10a of the variable reflector 10 toward the illuminated region p that is unnecessary for the illuminated region p while being provided with an opening 11a to transmit the remaining portion of the reference beam R. In this embodiment, the opening 11a may have a width (left-to-right dimension in FIG. 2) is 3.61 mm, for example.

FIG. 2 shows the state that the variable reflectors 10, 12 and the light shield 11 are at the middle point of the swinging stroke. The reflecting surface 10a of the variable reflector 10 for recording at the middle point of the stroke defines an angle $\alpha$ with respect to the reference beam R incident thereon (hereinafter, "tilt angle"). The luminous flux diameter d of the reference beam R incident on the reflecting surface 10a is, for example, about 2 mm. In this embodiment, the incident angle $\theta r$ of reference beam R reflected by the reflecting surface 10a and made incident on the illuminated region p may be set e.g. 58 degrees with the reflecting surface 10a located at the middle point of the stroke. Between the incident angle $\theta r$ of the reference beam and the tilt angle $\alpha$ of the reflecting surface 10a, the relation of $\theta r=2\alpha$ is established. In the case of changing the incident angle $\theta r$ of the reference beam R in a range of $\pm a$ (=15 degrees) under such condition, the tilt angle $\alpha$ of the reflecting surface 10a is caused to swing in a range of ±a/2 (=7.5 degrees) about the predetermined axis x. The light shield 11 is so set that the normal of the opening 11a and the reference beam R define an angle of e.g. 65.4 degrees when located at the middle point of the stroke.

The reflecting surface 12a of the variable reflector 12 for reproduction is so set that the incident angle of the reference beam for reproduction becomes equal to the incident angle θr for recording. When the angle between the reflecting surface 12a and the reference beam R incident thereon is represented by β, the relation of θr=90−2β is established between the angle β and the incident angle θr of the reference beam R.

The predetermined axis x about which the variable reflectors 10, 12 swing is located at a predetermined position defined based on the illuminated region p as the reference in a manner such that the incident angle θr of the reference beam becomes smaller as the reflecting surface 10a swings in a direction away from the hologram recording medium B (counterclockwise) and that the incident angle θr of the reference beam becomes larger as the reflecting surface 10a swings in a direction toward the hologram recording medium B (clockwise). In this embodiment, specifically, the predetermined axis x is located at a position shifted by 3.95 mm downward and 0.38 mm to the right, from the focal point of the recording beam S included by the illuminated region p. Otherwise, the linear distance from the center of the reference beam R incident on the reflecting surface 10a to the predetermined axis x is 15.18 mm, and the linear distance from the center of the opening 11a of the light shield 11 to the predetermined axis x is 6.42 mm, at the middle point of the stroke.

The recording beam S is converged by the objective lens 5, and is emitted so as to be superposed on the reference beam R at the illuminated region p. The objective lens 5 is obliquely oriented with respect to the hologram recording medium B so as to emit the recording beam S at the fixed incident angle θs. Accordingly, the reference beam R can have the incident angle θr changed over a wide range without being blocked by the objective lens 5. Such configuration allows variably controlling the incident angle θr of the reference beam R finely thereby facilitating the multiplicity of the hologram. As shown in FIG. 2, the illuminated region p includes a region p0 where the hologram is substantially recorded through the interference between the recording beam S and the reference beam R (hereinafter, "recordable region") and a region p1 exposed only to the reference beam R (hereinafter, "surplus exposure region") on the respective sides of the recordable region. Thus, a unit recording region including the recordable region p0 and the unnecessary exposure region p1 is formed on the recording layer 90 of the hologram recording medium B, and the holograms based on different interference patterns are recorded on the recordable region p0 of the unit recording region in multiple according to the change of the incident angle θr of the reference beam R.

Next, an operation of the hologram recording device A, in particular the optical performance in the recording process, will be described.

When the variable reflector 10 is at the middle point of the stroke as shown in FIG. 2 in the recording process, the recording beam S emitted at the fixed incident angle θs (=28 degrees) and the reference beam R emitted at the predetermined incident angle θr (=58 degrees) mutually interfere on the recording layer 90, so that the hologram based on the incident angle θr of the reference beam R is recorded on the recordable region p0. On the respective sides of the recordable region p0, the unnecessary exposure region p1 which is exposed only to the reference beam R and not illuminated with the recording beam S is formed.

Under such state, a part of the peripheral portion of the reference beam R advancing from the reflecting surface 10a toward the illuminated region p is blocked by a periphery of the opening 11a of the light shield 11, so that the remaining portion of the reference beam R passes through the opening 11a to reach the illuminated region p. In other words, the luminous flux diameter d of the reference beam R before reaching the reflecting surface 10a is slightly narrowed by the light shield 11. Accordingly, the unnecessary exposure region p1 illuminated only with the reference beam R is restricted from largely expanding on the respective sides of the recordable region p0.

Figure 3:
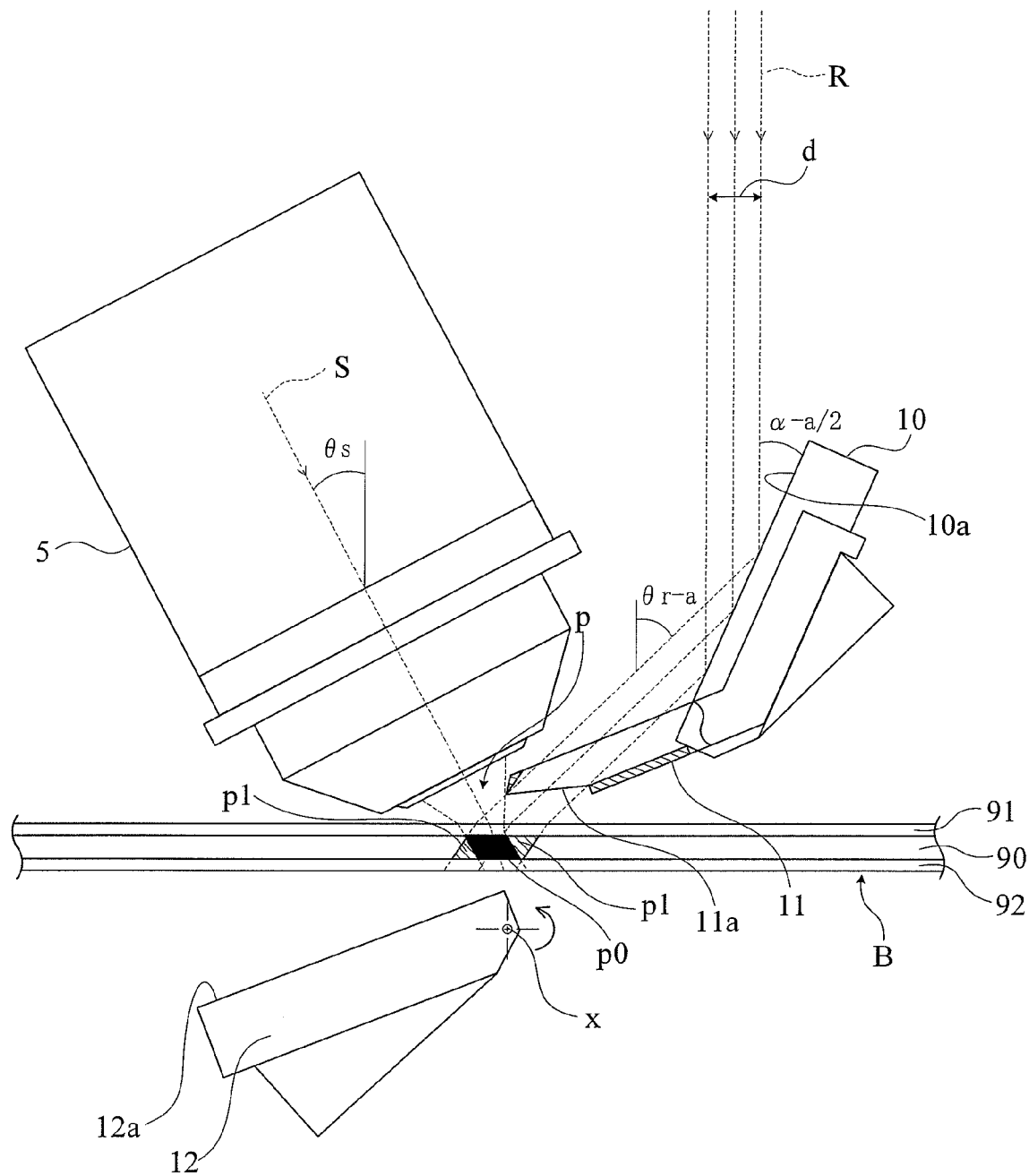
FIG. 3 is a cross-sectional view for explaining the optical performance of the hologram recording device shown in FIG. 1.

Then the incident angle of the reference beam R is caused to change from θr to θr−a (=43 deg.) as shown in FIG. 3 with the recording beam S being emitted at the fixed incident angle θs. At this moment, the variable reflector 10 for recording is swing counterclockwise about the predetermined axis x in a manner such that the tilt angle of the reflecting surface 10a becomes α−a/2 (=21.5 degrees). Accordingly, the recording beam S and the reference beam R emitted at the predetermined incident angle θr−a mutually interfere on the recording layer 90. As a result, on the recordable region p0, another hologram based on the reference beam R of the incident angle θr−a is formed in addition to the hologram precedently recorded, so that the holograms optically overlap.

At this moment also, the unnecessary exposure region p1 exposed only to the reference beam R is formed on the respective sides of the recordable region p0. When the incident angle of the reference beam R is reduced from θr to θr−a, the reference beam R is barely blocked by the light shield 11 and then reaches the illuminated region p in the state that the luminous flux diameter d is substantially kept constant. At this moment, the illumination width of the reference beam R on the illuminated region p becomes minimal according to the illuminance cosine law, and the size of the unnecessary exposure region p1 is also reduced. The unnecessary exposure region p1 is a region where the hologram is not recorded, however since the sensitivity is degraded by repeated exposure to the reference beam R, the hologram can no longer be recorded on the surplus exposure region p1. Thus, the unit recording regions of the hologram corresponding to the illuminated region p are formed with a spacing therebetween provided such that the unnecessary exposure regions p1 do not overlap.

Figure 4:
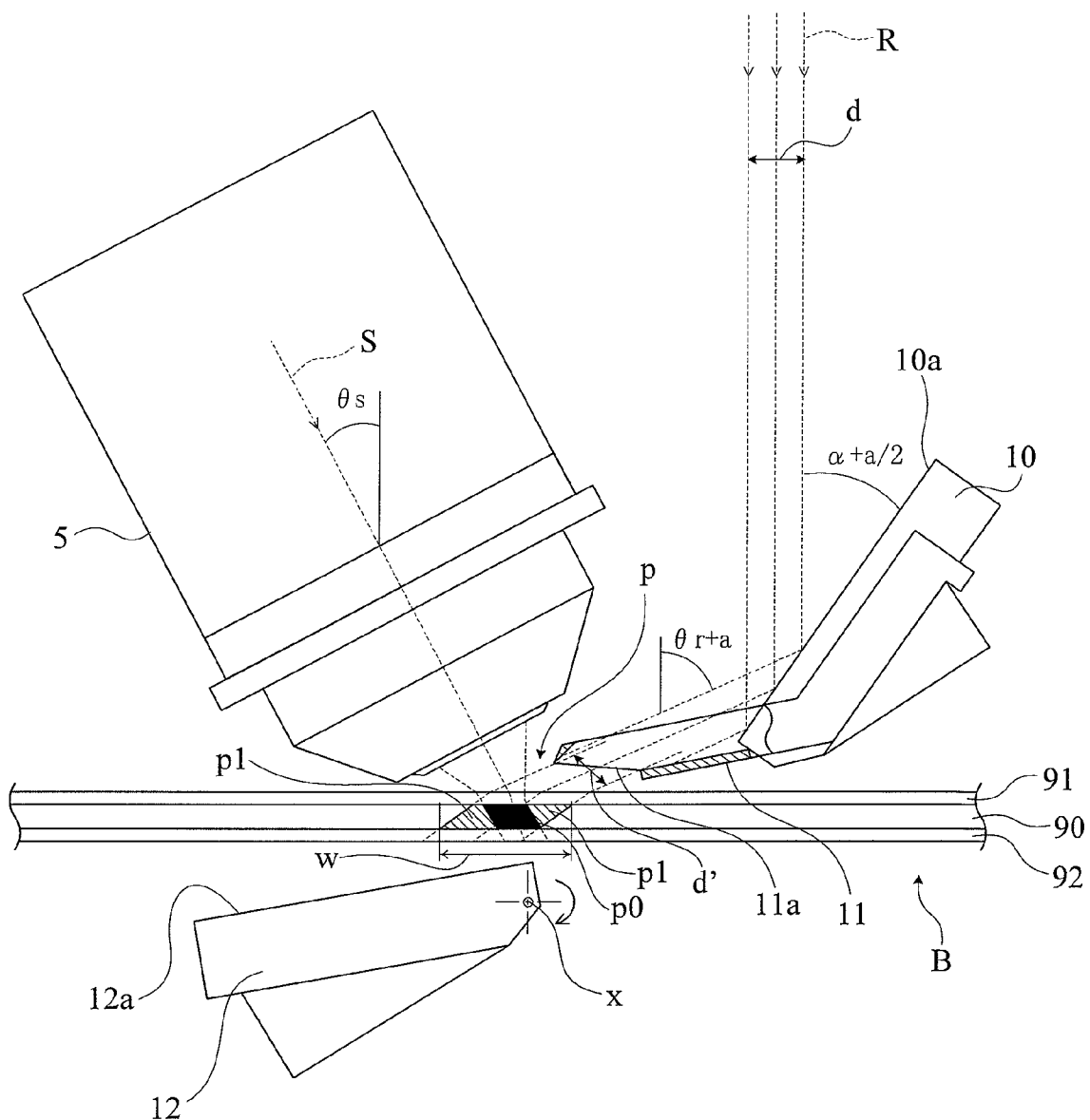
FIG. 4 is another cross-sectional view for explaining the optical performance of the hologram recording device shown in FIG. 1.

Referring now to FIG. 4, the incident angle of the reference beam R is changed from θr to θr+a (=73 degrees), with the recording beam S being emitted at the fixed incident angle θs. At this moment, the variable reflector 10 for recording is swung clockwise about the predetermined axis x, contrary to the foregoing case, in a manner such that the tilt angle of the reflecting surface 10a becomes α+a/2 (=36.5 degrees). Accordingly, the recording beam S and the reference beam R emitted at the predetermined incident angle θr+a mutually interfere on the recording layer 90. As a result, on the recordable region p0, another hologram based on the reference beam R of the incident angle θr+a is recorded in addition to the holograms previously recorded, so that the holograms optically overlap.

In the case where the incident angle of the reference beam R is thus increased from θr to θr+a, a larger peripheral portion of the reference beam R advancing from the reflecting surface 10a toward the illuminated region p is blocked by a portion of the light shield 11 adjacent to the opening 11a than the case where the incident angle is θr, whereby the remaining portion of the reference beam R passes through the opening 11a to reach the illuminated region p. In other words, the luminous flux diameter d of the reference beam R before reaching the reflecting surface 10a is significantly narrowed by the light shield 11. Accordingly, although the unnecessary exposure region p1 illuminated only with the reference beam R is formed at the region on the respective sides of the recordable region p0, the formed unnecessary exposure region p1 is not large.

In the case, for example, where the luminous flux diameter d of the reference beam R before reaching the reflecting surface 10a is 2 mm, the luminous flux diameter d' of the reference beam R reaching the illuminated region p is narrowed to a certain extent by the light shield 11, and the illumination width of the reference beam R becomes d'/cos (θr+a)=3.42 d'. The entire width w of the illuminated region p including the unnecessary exposure region p1 becomes, for example, 4.66 mm. Accordingly, the unit recording regions are formed with a spacing of about 4.66 mm.

Figure 5:
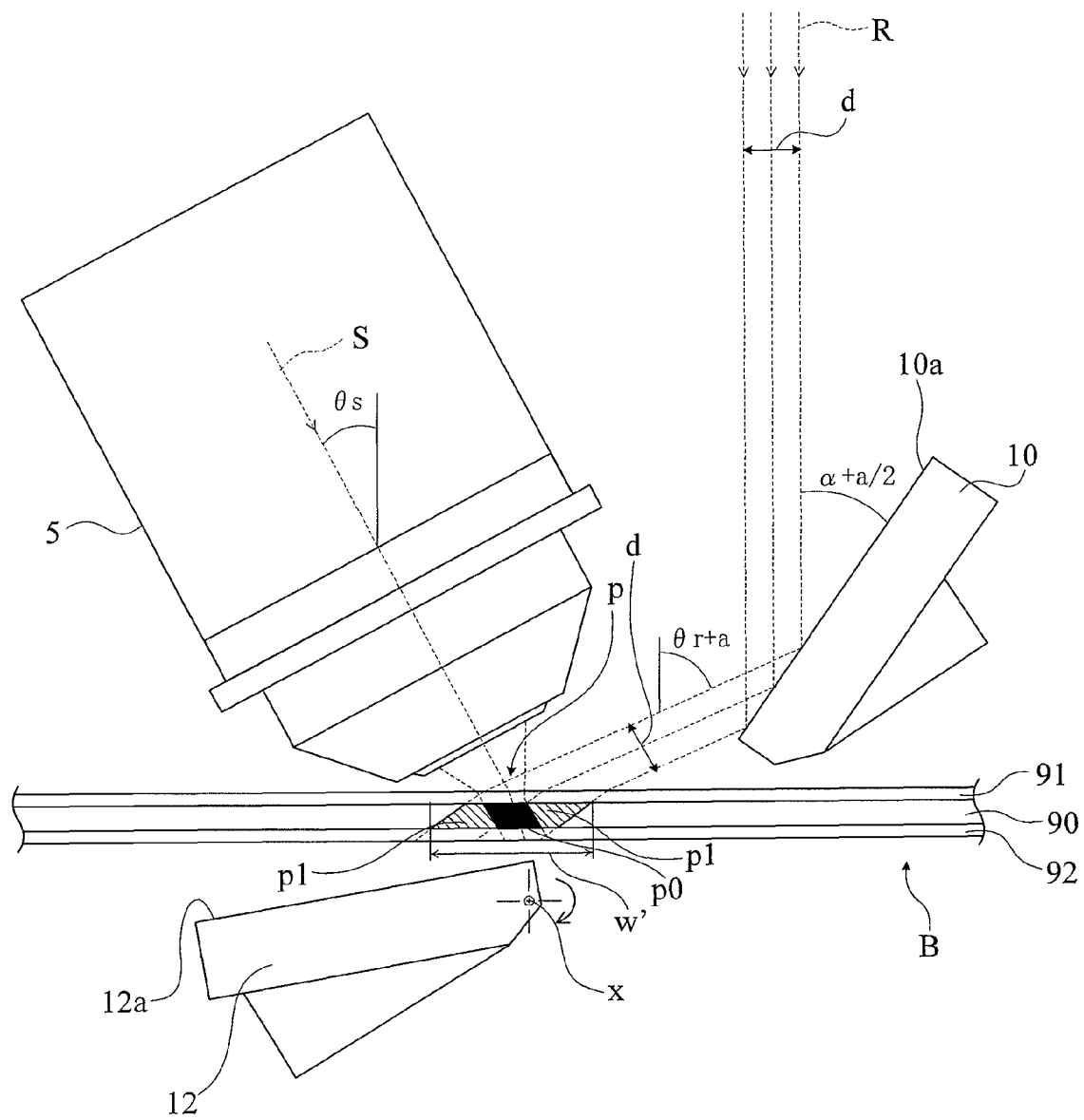
FIG. 5 is a cross-sectional view for explaining the optical performance of a hologram recording device without the key feature, for reference.

For reference, FIG. 5 depicts the same structure as FIG. 4 but without the light shield. As shown in FIG. 5, in the case where the light shield is absent, the reference beam R having the luminous flux diameter d of about 2 mm reaches the illuminated region p maintaining the initial luminous flux diameter without having it narrowed. Accordingly, the illumination width of the reference beam R becomes d/cos(θr+a)=3.42 d, and the width w' of the entire illuminated region p including the unnecessary exposure region p1 becomes 7.66 mm, for example. Thus, the unit recording regions have to be formed with a spacing of about 7.66 mm, which requires about 1.7 times as wide spacing as the case of FIG. 4. As is apparent from the above, the structure including the light shield 11 according to this embodiment is more advantageous for increasing the recording density.

In the reproduction process, the reference beam R is emitted from below the hologram recording medium B to the recordable region p0 where the holograms are recorded in multiple, while the variable reflector 12 for reproduction is variably controlled in a manner such that the incident angle becomes the same as that in the recording process. The reference beam R interferes with the hologram, whereby a reproduction beam is generated from the recordable region p0, and the information recorded in the form of the hologram is reproduced by receiving the reproduction beam. It should be noted that, theoretically, the variable reflector for reproduction may also be provided with the light shield, like the variable reflector for recording. In this case, diffuse reflection caused by the unnecessary exposure in the reproduction process can be significantly suppressed.

With the hologram recording device A according to this embodiment, therefore, the light shield 11 that swings integrally with the variable reflector 10 inhibits the unnecessary exposure region p1 from largely expanding even when the incident angle θr of the reference beam R becomes relatively large. This allows reducing the spacing between the unit recording regions on the hologram recording medium B as possible, and thereby increasing the overall recording density.

A hologram recording device according to another embodiment of the present invention will now be described. Hereinafter, the same or similar constituents to those of the foregoing embodiment will be given the same numeral, and the description thereof will not be repeated.

Figure 6:
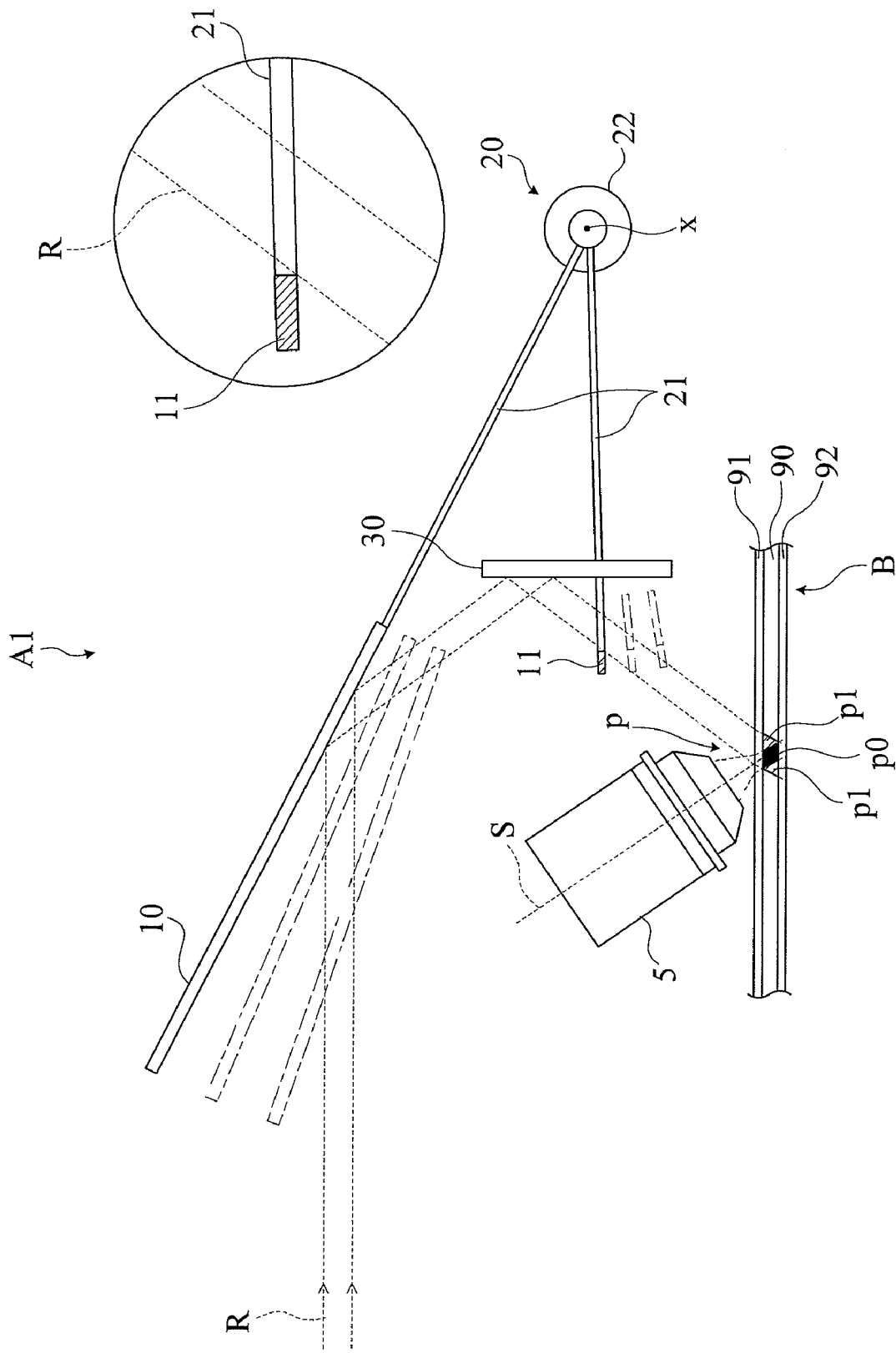
FIG. 6 is a cross-sectional view showing another embodiment of a hologram recording device to which the present invention is applied.
Figure 7:
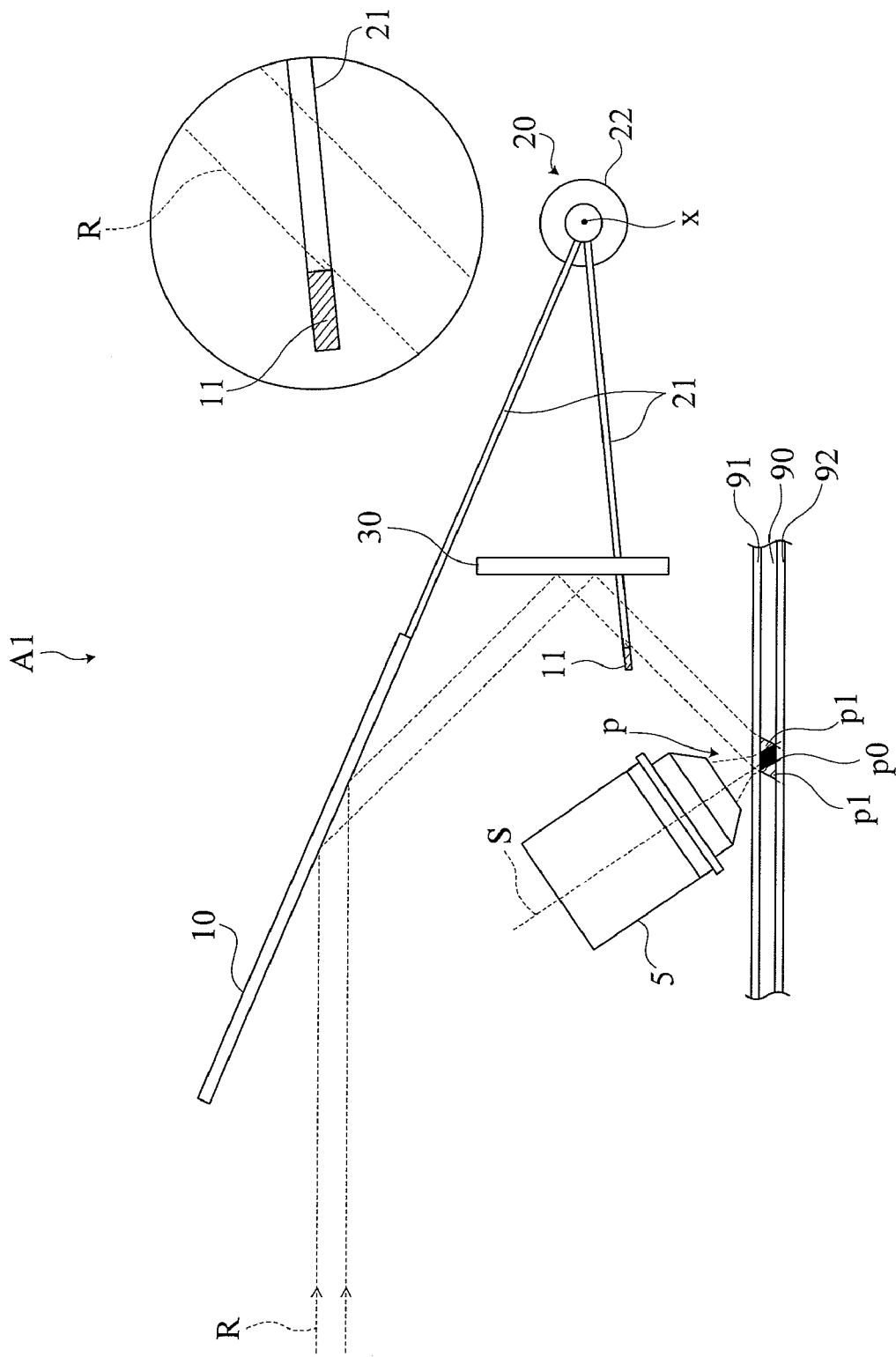
FIG. 7 is a cross-sectional view for explaining the optical performance of the hologram recording device shown in FIG. 6.
Figure 8:
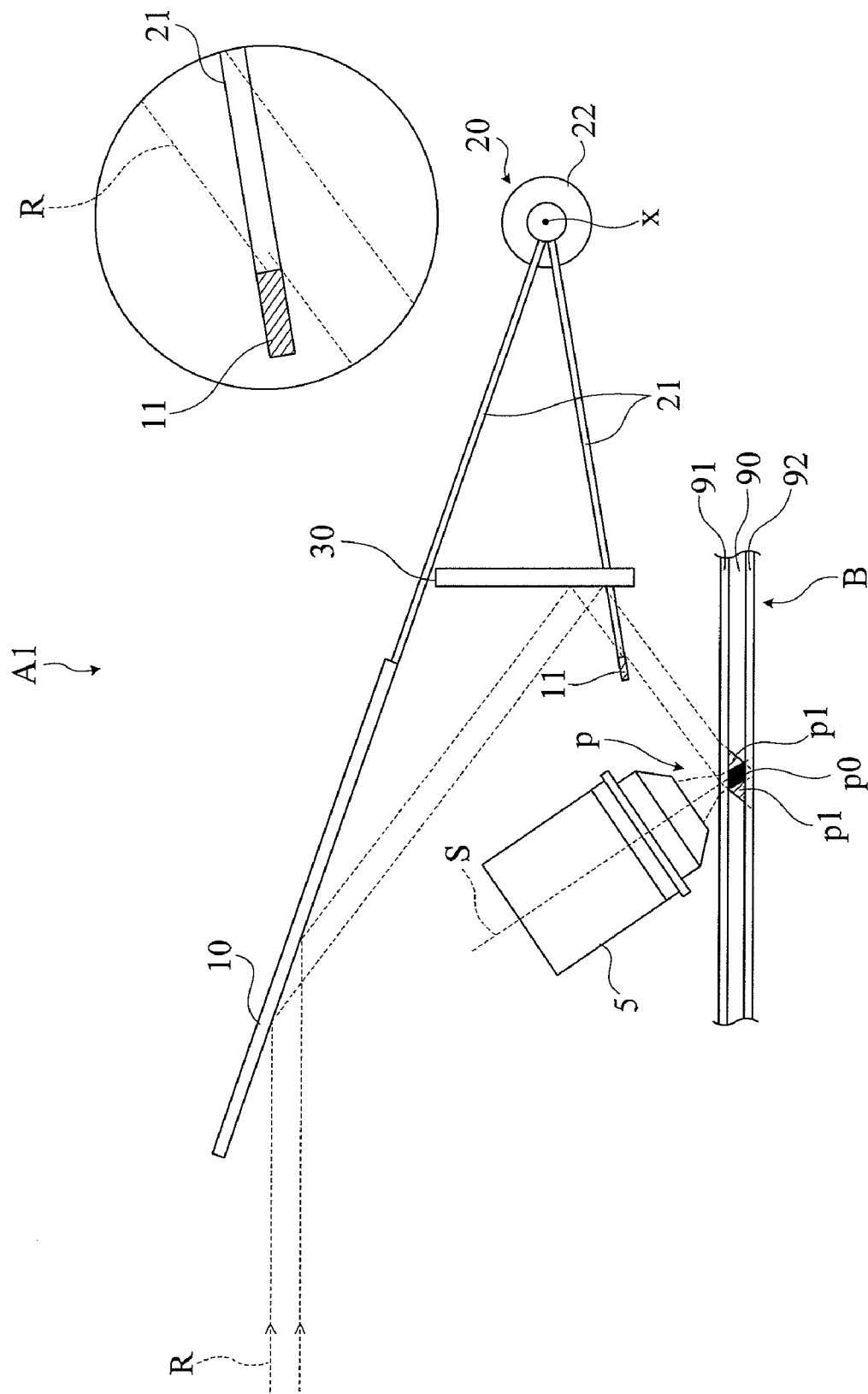
FIG. 8 is another cross-sectional view for explaining the optical performance of the hologram recording device shown in FIG. 6.

As shown in FIGS. 6 to 8, the hologram recording device A1 according to another embodiment includes, as the reference beam optical system, a variable reflector 10 for recording, a light shield 11, a fixed reflector 30 for recording, and a swinging unit 20 that swings the variable reflector 10 and the light shield 11 integrally. The swinging unit 20 includes an arm member 21 that supports the variable reflector 10 for recording and the light shield 11, and a driving motor 22 that swings the arm member 21 about a predetermined axis x. The variable reflector 10 and the light shield 11 are fixed to end portions of the arm member 21 so as to be arranged at predetermined angles. Here, though not shown, a variable reflector for reproduction, a fixed reflector and so forth which are similarly configured to those for recording are provided under the hologram recording medium B.

The reference beam R advances generally parallel to the hologram recording medium B, thus to be incident on the variable reflector 10. The variable reflector 10 reflects the reference beam R obliquely downward toward the fixed reflector 30. The fixed reflector 30 is fixed at a predetermined position above the hologram recording medium B, and reflects the reference beam R led from the variable reflector 10 obliquely downward toward the illuminated region p.

The light shield 11, which swings integrally with the variable reflector 10, is located on the optical path of the reference beam R advancing from the fixed reflector 30 toward the illuminated region p. The arm member 21 supporting the light shield 11 is arranged so as to by-pass round a lateral edge of the fixed reflector 30. This permits the light shield 11 to swing without the interference by the fixed reflector 30.

FIG. 6 depicts the variable reflector 10 and the light shield 11 held at the position that makes the incident angle of the reference beam R minimal. FIG. 6 also includes a circle showing an enlarged view of a portion around the light shield 11 where the reference beam R passes through. Under the state where the incident angle of the reference beam R is minimal, the reference beam R is barely blocked by the light shield 11 before reaching the illuminated region p. The predetermined axis x about which the variable reflector 10 and the light shield 11 swing is located at a predetermined position behind the fixed reflector 30.

When the variable reflector 10 and the light shield 11 are held at the position that makes the incident angle of the reference beam R minimal as shown in FIG. 6, the recording beam S of the fixed incident angle and the reference beam R of the minimal incident angle interfere on the recording layer 90, so that the hologram is recorded on the recordable region p0. On the respective sides of the recordable region p0, the unnecessary exposure region p1, which is exposed only to the reference beam R and not illuminated by the recording beam S, is formed. At this moment, the reference beam R reaches the illuminated region p without being blocked by the light shield 11, such that the illumination width of the reference beam R on the illuminated region p becomes about 1.465 mm, for example.

Then the variable reflector 10 and the light shield 11 are rotated counterclockwise and held at a position shown in FIG. 7, so that the incident angle of the reference beam R becomes larger than the state shown in FIG. 6. Under such state, a part of a left peripheral portion of the reference beam R is blocked by the light shield 11 as shown in the circle in FIG. 7, and the remaining portion of the reference beam R reaches the illuminated region p without being blocked by the light shield 11. In other words, the luminous flux diameter of the reference beam R before reaching the fixed reflector 30 is slightly narrowed by the light shield 11. Accordingly, the unnecessary exposure region p1 illuminated only with the reference beam R is restricted from largely expanding on the respective sides of the recordable region p0. In this case, the illumination width of the reference beam R on the illuminated region p becomes about 1.549 mm.

Then the variable reflector 10 and the light shield 11 are rotated farther counterclockwise and held at a position shown in FIG. 8, so that the incident angle of the reference beam R becomes maximal. Under such state, a part of the left side peripheral portion of the reference beam R is blocked by the light shield 11 over a larger region than the case of FIG. 7 as shown in the circle in FIG. 8, and the remaining portion of the reference beam R reaches the illuminated region p without being blocked by the light shield 11. Accordingly, the surplus exposure region p1 illuminated only with the reference beam R is restricted from largely expanding on the respective sides of the recordable region p0, even when the incident angle of the reference beam R becomes maximal. In this case, the illumination width of the reference beam R on the illuminated region p becomes about 1.487 mm. If the light shield is absent when the incident angle of the reference beam R is maximal as shown in FIG. 8, the reference beam is emitted with the initial luminous flux diameter unchanged, and the illumination width of the reference beam on the illuminated region significantly expands, to about 2.042 mm.

With the hologram recording device A1 according to this embodiment also, therefore, since the light shield 11 that swings integrally with the variable reflector 10 are provided, the unnecessary exposure region p1 is restricted from largely expanding even when the incident angle of the reference beam R becomes relatively large, which allows minimizing the spacing between the unit recording regions on the hologram recording medium B and thereby increasing the overall recording density.

Figure 9:
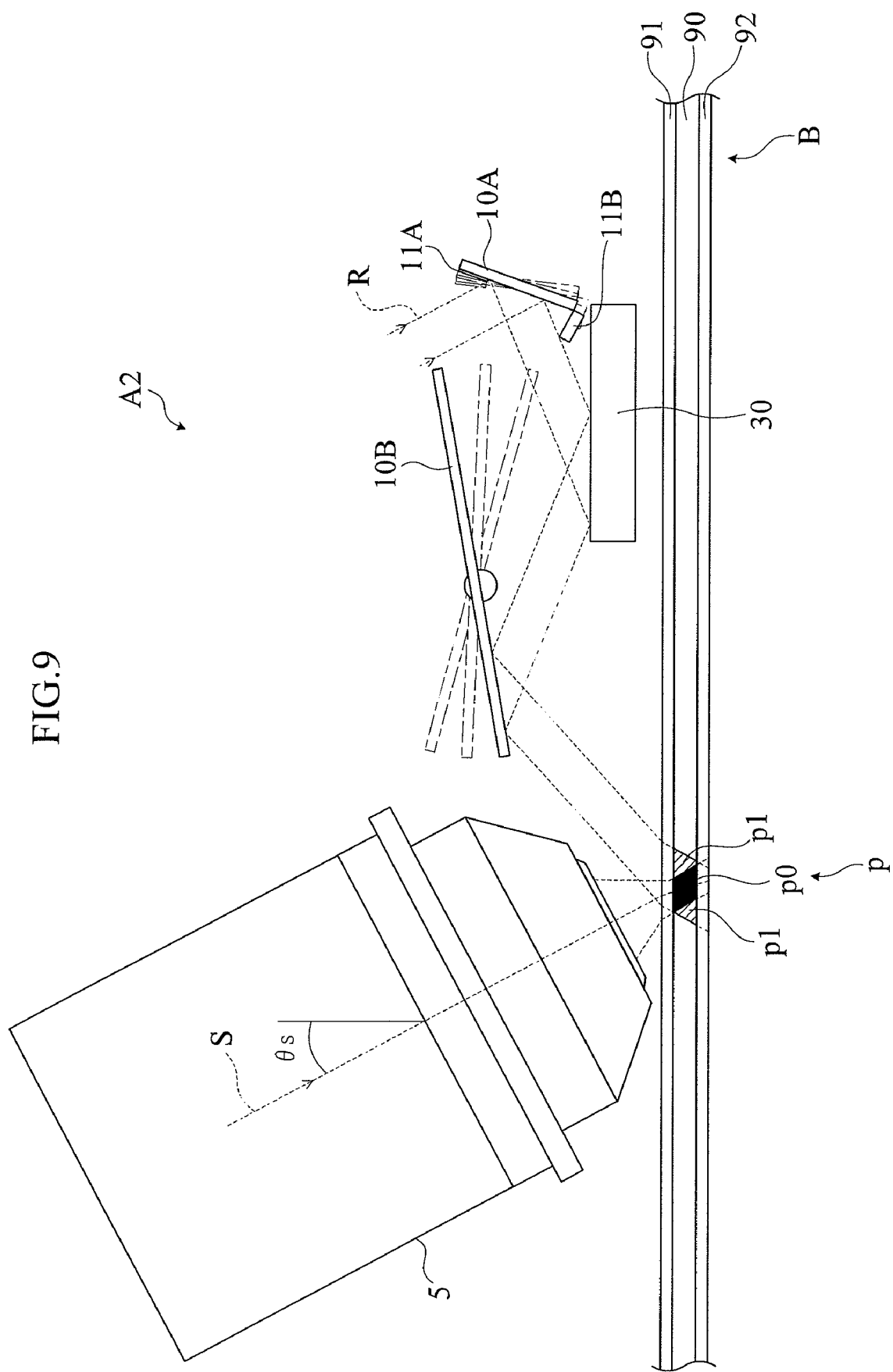
FIG. 9 is a cross-sectional view showing still another embodiment of a hologram recording device to which the present invention is applied.
Figure 10:
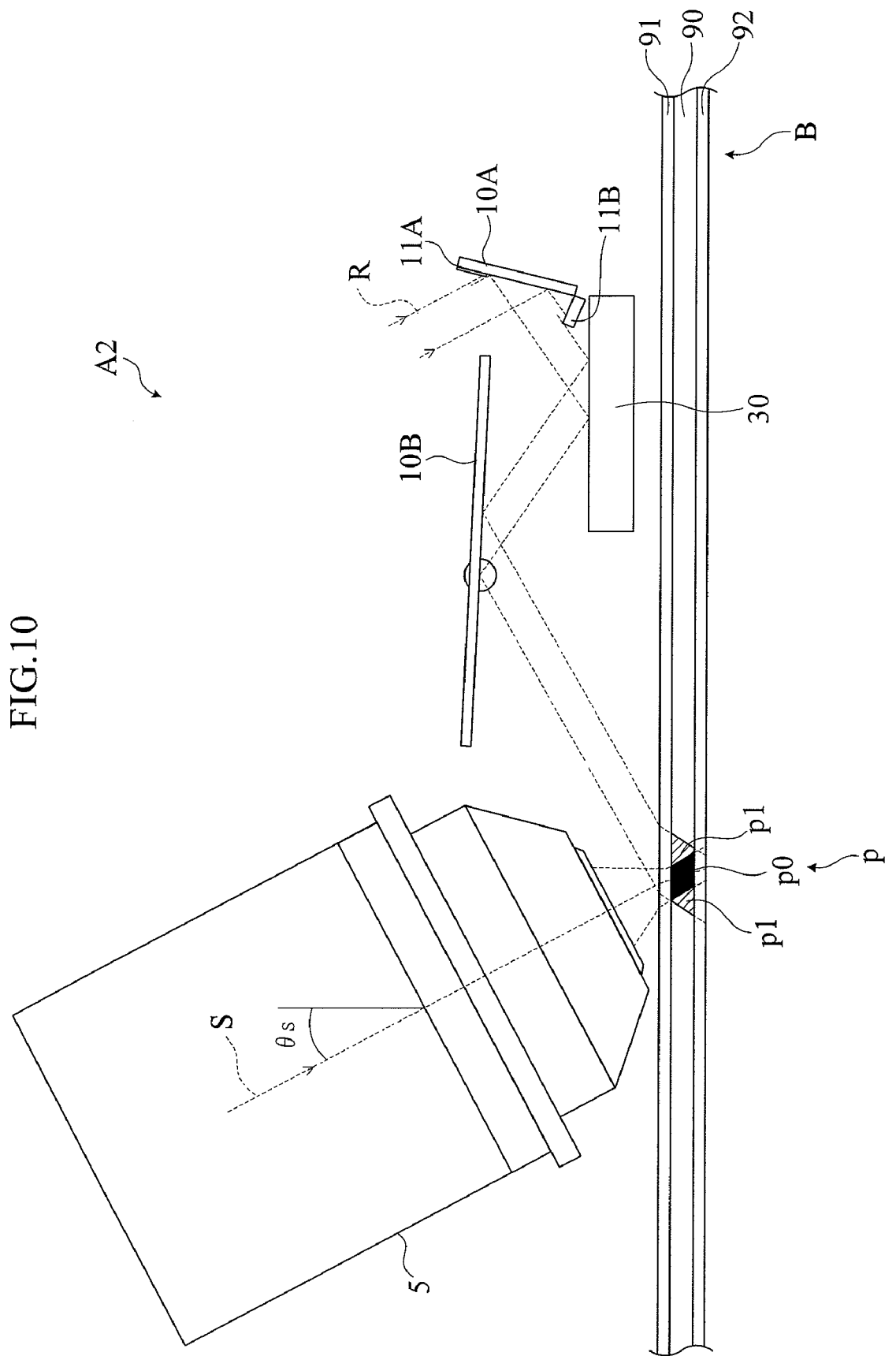
FIG. 10 is a cross-sectional view for explaining the optical performance of the hologram recording device shown in FIG. 9.
Figure 11:
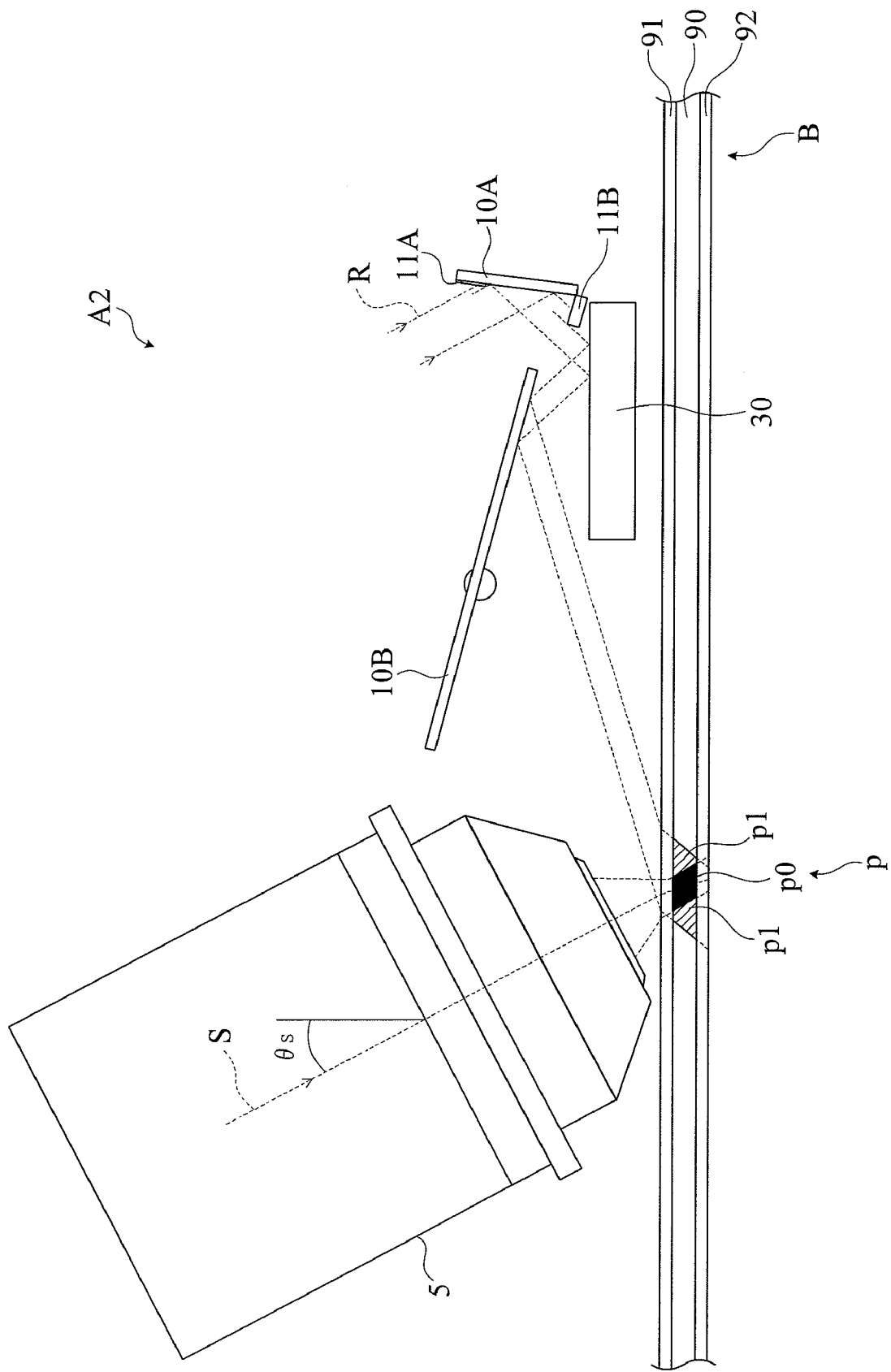
FIG. 11 is another cross-sectional view for explaining the optical performance of the hologram recording device shown in FIG. 9.

Referring further to FIGS. 9 to 11, a hologram recording device A2 according to another embodiment includes, as the reference beam optical system, a first and a second variable reflector for recording 10A, 10B, a first and a second light shield 11A, 11B integrally formed with the first variable reflector 10A, a fixed reflector 30 for recording, and a swinging unit (not shown) that swings the first and the second variable reflector 10A, 10B at the same time. Each of the first and the second variable reflector 10A, 10B is configured to swing about an axis (not shown) that passes through itself in a mutually interlocked manner. The fixed reflector 30 is fixed at a predetermined position above the hologram recording medium B, and reflects the reference beam R led from the first variable reflector 10A obliquely upward toward the second variable reflector 10B. Here, though not shown, two variable reflectors for reproduction similarly configured to those for recording, a fixed reflector and so forth are provided under the hologram recording medium B.

The reference beam R advances obliquely downward with respect to the hologram recording medium B, thus to be made incident on the first variable reflector 10A. The first variable reflector 10A reflects the reference beam R obliquely downward toward the fixed reflector 30. The fixed reflector 30 reflects the reference beam R led from the first variable reflector 10A obliquely upward toward the second variable reflector 10B. The second variable reflector 10B reflects the reference beam R led from the fixed reflector 30 obliquely downward toward the illuminated region p. In the case where the first variable reflector 10A swings counterclockwise, the second variable reflector 10B is swung clockwise, contrary to the first variable reflector 10A. In this embodiment, the first and the second variable reflector 10A, 10B are swung in a manner such that the incident angle of the reference beam R becomes 48 degrees, 60.5 degrees, and 73 degrees.

The first and the second light shield 11A, 11B are swung integrally with the first variable reflector 10A. The first light shield 11A is configured to block a part of an upper peripheral portion of the reference beam R right before reaching the first variable reflector 10A, and the second light shield 11B is configured to block a part of a lower peripheral portion of the reference beam R right after being reflected by the first variable reflector 10A.

FIG. 9 depicts the first and the second variable reflector 10A, 10B held at the position that makes the incident angle of the reference beam R minimal (48 degrees). Under the state where the incident angle of the reference beam R is minimal, the reference beam R is barely blocked by the first and the second light shield 11A, 11B before reaching the illuminated region p. At this moment, the recording beam S of the fixed incident angle and the reference beam R of the minimal incident angle interfere on the recording layer 90, so that the hologram is recorded on the recordable region p0. On the both sides of the recordable region p0, the unnecessary exposure region p1, which is exposed only to the reference beam R and not illuminated with the recording beam S, is formed.

Then the first and the second variable reflector 10A, 10B are slightly rotated in a predetermined direction and held at a position shown in FIG. 10, so that the incident angle of the reference beam R becomes larger than the state shown in FIG. 9. Under such state, on the first variable reflector 10A, a part of the upper peripheral portion of the reference beam R is blocked by the light shield 11A and a part of the lower peripheral portion of the reference beam R is blocked by the light shield 11B, so that the remaining portion of the reference beam R reaches the illuminated region p without being blocked. On the assumption that the initial luminous flux diameter is 1.8 mm, the luminous flux diameter of the reference beam R right before reaching the illuminated region p becomes about 1.41 mm. Accordingly, the unnecessary exposure region p1 illuminated only with the reference beam R is restricted from largely expanding on the respective sides of the recordable region p0.

Then the first and the second variable reflector 10A, 10B are rotated farther in the predetermined direction and held at a position shown in FIG. 11, so that the incident angle of the reference beam R becomes maximal (73 degrees). Under such state, on the first variable reflector 10A, a part of the upper and lower peripheral portion of the reference beam R is blocked by the first and the second light shield 11A, 11B over a larger region than the case of FIG. 10, so that the remaining portion of the reference beam R reaches the illuminated region p without being blocked. In this case, the luminous flux diameter of the reference beam R immediately before reaching the illuminated region p becomes approx. 1.01 mm, for example. Accordingly, the unnecessary exposure region p1 illuminated only with the reference beam R is restricted from largely expanding on the respective sides of the recordable region p0, even when the incident angle of the reference beam R becomes maximal. If the light shield is absent when the incident angle of the reference beam R is maximal as shown in FIG. 11, the reference beam is emitted with the initial luminous flux diameter (1.8 mm) unchanged, and the illumination width of the reference beam on the illuminated region significantly expands.

With the hologram recording device A2 according to this embodiment also, therefore, since the first and the second light shield 11A, 11B that swing integrally with the first variable reflector 10A are provided, the unnecessary exposure region p1 is restricted from largely expanding even when the incident angle of the reference beam R becomes relatively large, which allows minimizing the spacing between the unit recording regions on the hologram recording medium B and thereby increasing the overall recording density.

It is to be understood that the present invention is not limited to the foregoing embodiments.

The sizes cited in the embodiments are merely exemplary, and may be appropriately modified according to the design specification.

The invention claimed is:

1. A hologram recording device for irradiating a recording beam to a hologram recording medium, and irradiating a reference beam to an illuminated region of the recording beam by variably controlling an incident angle of the reference beam on the hologram recording medium, whereby a hologram is recorded on the illuminated region in multiple through interference between the recording beam and the reference beam, the device comprising:
   at least one variable reflector directing the reference beam to the illuminated region by reflection and being swung around a predetermined axis for changing the incident angle of the reference beam;
   a light shield being swung integrally with the variable reflector for partially shielding the reference beam so that a luminous flux diameter of the reference beam becomes narrower as the incident angle becomes larger; and
   a fixed reflector for reflecting the reference beam from the variable reflector at a fixed reflecting surface;
   wherein the reference beam is made incident on the variable reflector in a fixed direction and with a fixed luminous flux diameter, and is irradiated to the illuminated region through the light shield after being reflected by the variable reflector and being again reflected by the fixed reflector.

2. A hologram recording device for irradiating a recording beam to a hologram recording medium, and irradiating a reference beam to an illuminated region of the recording beam by variably controlling an incident angle of the reference beam on the hologram recording medium, whereby a hologram is recorded on the illuminated region in multiple through interference between the recording beam and the reference beam, the device comprising:
   at least one variable reflector directing the reference beam to the illuminated region by reflection and being swung around a predetermined axis for changing the incident angle of the reference beam;
   a light shield being swung integrally with the variable reflector for partially shielding the reference beam so that a luminous flux diameter of the reference beam becomes narrower as the incident angle becomes larger; and
   a fixed reflector;
   wherein the variable reflector includes a first and a second variable reflector, and the fixed reflector reflects the reference beam at a reflecting surface fixed between the first and the second variable reflector, wherein the reference beam is made incident on the first variable reflector in a fixed direction and with a fixed luminous flux diameter, is led to the fixed reflector through the light shield right before and right after being reflected by the first variable reflector, and is irradiated to the illuminated region after being reflected by the fixed reflector and then by the second variable reflector.

* * * * *